(12) United States Patent
Lin

(10) Patent No.: US 7,330,020 B1
(45) Date of Patent: Feb. 12, 2008

(54) VOLTAGE REGULATION UNIT WITH ZENER DIODE AND VOLTAGE REGULATION DEVICE THEREOF

(75) Inventor: Yung-Feng Lin, Dasi Township, Taoyuan County (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 11/545,571

(22) Filed: Oct. 11, 2006

(51) Int. Cl.
*G05F 3/04* (2006.01)

(52) U.S. Cl. .................................... 323/312

(58) Field of Classification Search ............... 323/282, 323/283, 284, 285, 312, 313
See application file for complete search history.

(56) References Cited

U.S. PATENT DOCUMENTS

| | | | | |
|---|---|---|---|---|
| 5,841,648 A | * | 11/1998 | Mansfield | 363/59 |
| 6,232,830 B1 | * | 5/2001 | Fournel | 327/540 |
| 2001/0019280 A1 | * | 9/2001 | Pulvirenti | 326/38 |
| 2004/0183584 A1 | * | 9/2004 | Minteer | 327/530 |
| 2007/0153589 A1 | * | 7/2007 | Tailliet | 365/189.06 |

* cited by examiner

*Primary Examiner*—Adolf Berhane
(74) *Attorney, Agent, or Firm*—Rabin & Berdo, PC

(57) ABSTRACT

A voltage regulation unit with a Zener diode receives a driving voltage outputted from a charge pump and controls a level of the driving voltage to regulate the driving voltage. The voltage regulation unit includes a current mapping unit, a Zener diode and a biasing unit. The current mapping unit receives the driving voltage and generates first and second current signals at master and slave current ends according to the driving voltage, respectively. The diode receives the first current signal and controls the level of the driving voltage to be substantially equal to a predetermined voltage level. The biasing unit receives the second current signal, judges whether the level of the driving voltage reaches the predetermined voltage level according to the second current signal, and outputs a control signal, which is fed back to the charge pump to control the charge pump to generate the driving voltage.

9 Claims, 6 Drawing Sheets

VOLTAGE REGULATION UNIT WITH ZENER DIODE AND VOLTAGE REGULATION DEVICE THEREOF

BACKGROUND OF THE INVENTION

1. Field of the Invention

The invention relates in general to a voltage regulation device with a Zener diode, and more particularly to a voltage regulation device, which has a Zener diode and can save power loss.

2. Description of the Related Art

FIG. 1A is a circuit diagram showing a conventional voltage regulation device with a Zener diode. An enabling signal EN is used to enable a voltage regulation device 100. A timing signal generating unit 102 is driven by the enabling signal EN to generate a timing signal CLK, and a charge pump 104 increases a voltage level of an output voltage Vout to drive a loading device 110 according to the timing signal CLK.

FIG. 1B shows a curve of the current with respect to the voltage of the Zener diode 106 of FIG. 1A. As shown in FIG. 1B, when the Zener diode 106 is operating in a breakdown region, it has a special voltage-to-current characteristic curve. In this case, no matter how the current Iz flowing through the Zener diode 106 is, a crossover voltage across two ends of the Zener diode 106 is substantially equal to a breakdown voltage Vz1 of the Zener diode 106 such that the output voltage Vout is substantially equal to the breakdown voltage Vz1 and the voltage regulating effect may be achieved. However, the conventional voltage regulation device 100 has several drawbacks.

The voltage regulation device 100 cannot terminate the operation of the charge pump 104 when the output voltage Vout reaches a predetermined voltage level. The charge pump 104 continuously operates to increase the voltage level of the output voltage Vout and to generate an output current flowing through the Zener diode 106 to the grounding level. Thus, the voltage regulation device 100 disadvantageously has the higher power consumption and the lower power efficiency. Besides, the output voltage Vout of Zener diode 106 varies as its temperature varies, since the temperature coefficient of the Zener diode 106 is not zero. The temperature coefficient of the Zener diode may be, for example, positive. Thus, the output voltage Vout of the regulation device 100 disadvantageously varies with the temperature.

FIG. 1C shows a circuit diagram of a conventional voltage regulation device with operational amplifier. Voltage regulation device 10 enables a transistor Tx for lifting the voltage level of an output voltage Vo2 through the output voltage Vo1 of the operational amplifier OP1. The voltage regulation device 10 further provides the output voltage Vo2 to the inverting input terminal of the operational amplifier OP1 in a signal feedback manner, for disabling the transistor Tx and pulling down the voltage level of the output voltage Vo2 through current source 112 when the voltage of the output voltage Vo2 is higher than a voltage V1. Such that, the output voltage Vo2 is regulated through the negative feedback manner. However, the conventional voltage regulation device 10 must use the operational amplifier OP1 to regulate the output voltage Vo2. Such that, the conventional voltage regulation device disadvantageously has high circuit complexity and high cost.

SUMMARY OF THE INVENTION

It is therefore an object of the invention to provide a voltage regulation unit with a Zener diode and a voltage regulation device thereof, which have the advantages of the lower power consumption, the higher power efficiency, the simple circuit structure and the low cost.

The invention achieves the above-identified object by providing a voltage regulation unit for receiving a driving voltage outputted from a charge pump and regulating the driving voltage. The voltage regulation unit includes a current mapping unit, a Zener diode and a biasing unit. The current mapping unit includes a master current end and a slave current end, receives the driving voltage and generates a first current signal and a second current signal at the master current end and the slave current end according to the driving voltage, respectively. The Zener diode has a negative end coupled to the master current end and a positive end for receiving a constant voltage. The Zener diode receives the first current signal and controls a voltage level of the driving voltage to be substantially equal to a predetermined voltage level to regulate the driving voltage. The biasing unit receives the second current signal, judges whether the voltage level of the driving voltage reaches the predetermined voltage level according to the second current signal, and generates a control signal according to the second current signal. The control signal is fed back to the charge pump to control the charge pump to generate the driving voltage.

The invention also achieves the above-identified object by providing a voltage regulation device including a charge pump, a voltage regulation unit, a detection unit and a timing signal generating unit. The charge pump outputs a driving voltage. The voltage regulation unit includes a current mapping unit, a Zener diode and a biasing unit. The current mapping unit includes a master current end and a slave current end. The current mapping unit receives the driving voltage and generates a first current signal and a second current signal at the master current end and the slave current end according to the driving voltage, respectively. The Zener diode has a negative end coupled to the master current end and a positive end for receiving a constant voltage. The Zener diode receives the first current signal and controls a voltage level of the driving voltage to be substantially equal to a predetermined voltage level to regulate the driving voltage. The biasing unit receives the second current signal, judges whether the voltage level of the driving voltage reaches the predetermined voltage level according to the second current signal, and generates a control signal according to the second current signal. The detection unit receives the control signal and generates a first enabling signal according to the control signal. The timing signal generating unit receives the first enabling signal and generates a timing signal and a backward timing signal according to the first enabling signal. The timing signal and the backward timing signal are outputted to the charge pump, which generates the driving voltage according to the timing signal and the backward timing signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
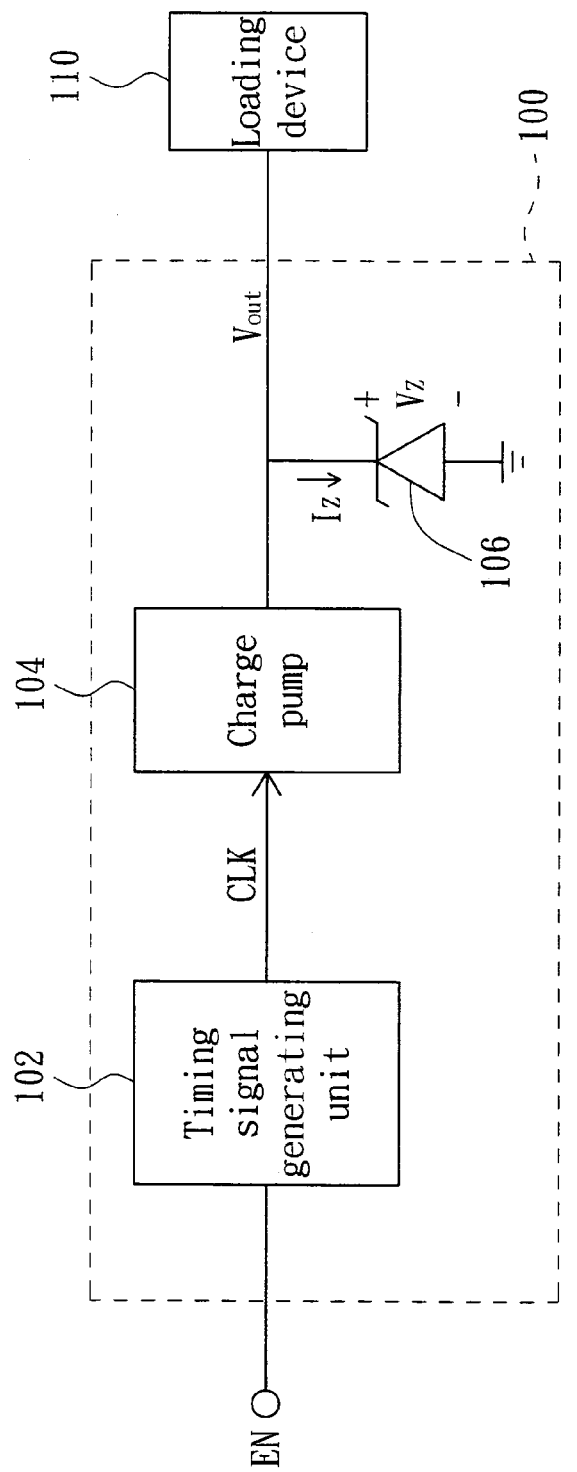
FIG. 1A (Prior Art) is a circuit diagram showing a conventional voltage regulation device with a Zener diode.
Figure 1B:
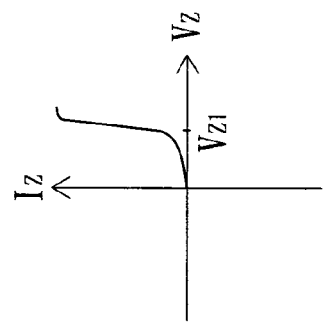
FIG. 1B (Prior Art) shows a curve of the current with respect to the voltage of the Zener diode 106 of FIG. 1A.
Figure 1C:
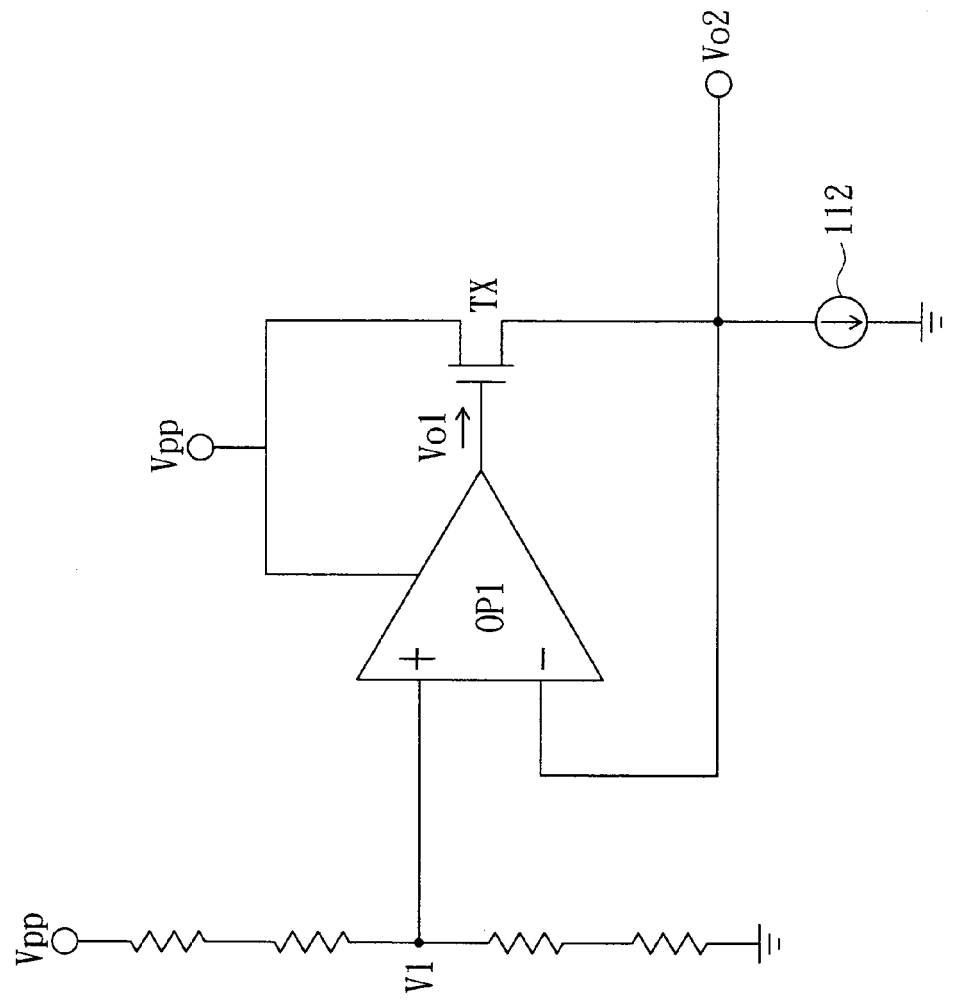
FIG. 1C (Prior Art) shows a circuit diagram of a conventional voltage regulation device with operational amplifier.
Figure 2A:
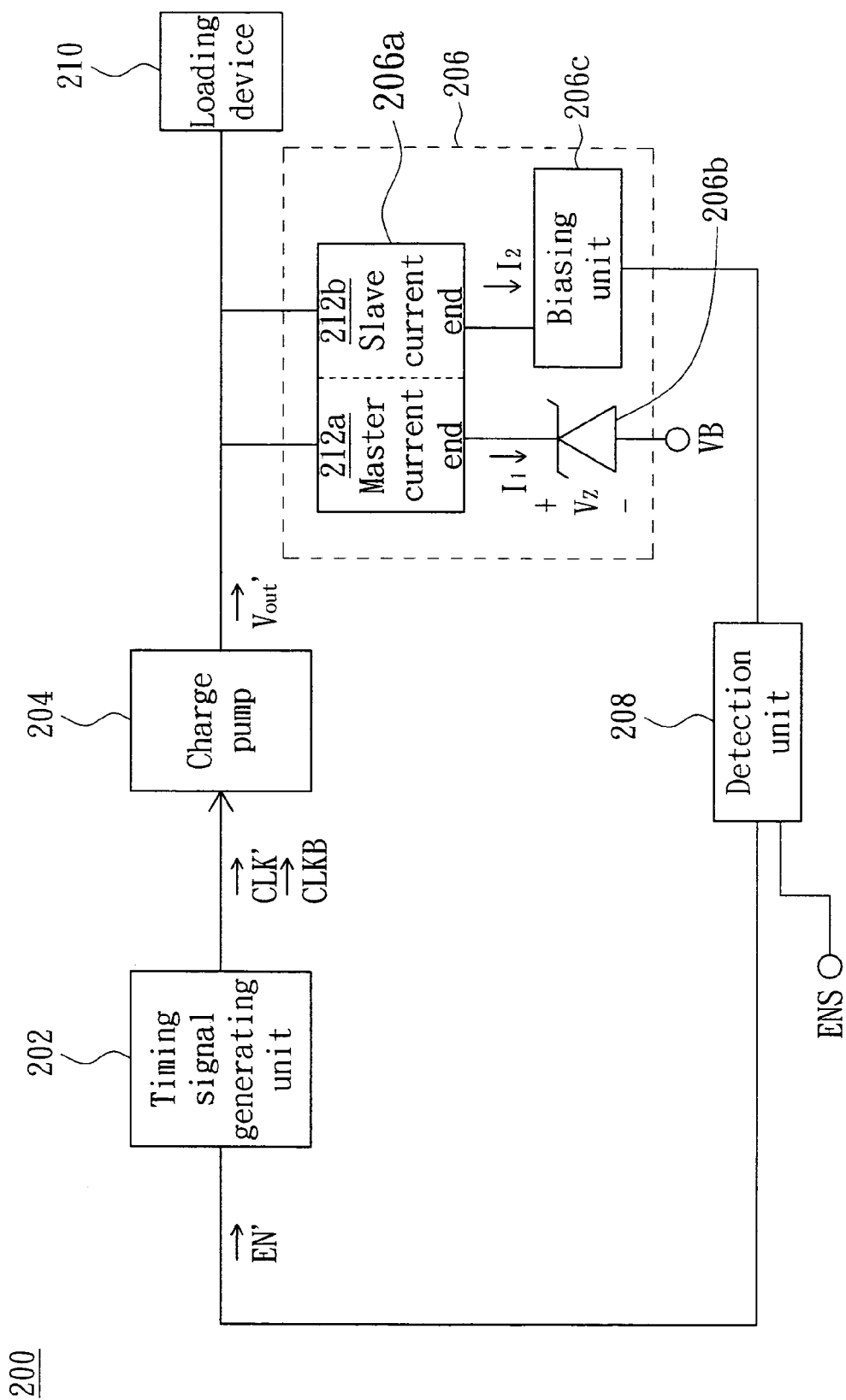
FIG. 2A is a circuit diagram showing a voltage regulation device with a Zener diode according to a preferred embodiment of the invention.

FIG. 2A is a circuit diagram showing a voltage regulation device 200 with a Zener diode according to a preferred embodiment of the invention. Referring to FIG. 2A, the voltage regulation device 200 includes a timing signal generating unit 202, a charge pump 204, a voltage regulation unit 206 and a detection unit 208. The timing signal generating unit 202 receives an enabling signal EN' to generate a timing signal CLK' and a backward timing signal CLKB. The charge pump 204 receives the timing signal CLK' and the backward timing signal CLKB to generate an output voltage Vout' to drive a loading device 210.

The voltage regulation unit 206 includes a current mapping unit 206a, a Zener diode 206b and a biasing unit 206c. The current mapping unit 206a has a master current end 212a and a slave current end 212b. The current mapping unit 206a receives the output voltage Vout' as a driving voltage, and generates a current signal I1 and a current signal I2 at the master current end 212a and the slave current end 212b according to the driving voltage, respectively. The current values of the current signals I1 and I2 relate to each other.

The Zener diode 206b has a negative end coupled to the master current end 212a and a positive end for receiving a constant voltage VB. The Zener diode 206b receives the current signal I1 and controls the voltage level of the output voltage Vout' to be substantially equal to a predetermined voltage level to regulate the output voltage Vout'. The biasing unit 206c receives the current signal I2, judges whether the voltage level of the output voltage Vout' reaches the predetermined voltage level according to the current signal I2, and generates a control signal SC according to the current signal I2. In this embodiment, the constant voltage VB may be, for example, a ground potential, and the current signals I1 and I2 have, for example, the same current value.

The detection unit 208 receives the control signal SC and detects whether or not the output voltage Vout' reaches the predetermined voltage level according to the control signal SC. If yes, the detection unit 208 sets the enabling signal EN' as a disabled level and feeds the enabling signal EN' back to the timing signal generating unit 202 to enable the timing signal generating unit 202 to stop generating the timing signal CLK' and the backward timing signal CLKB so as to terminate the operation of the charge pump 204. Consequently, it is possible to reduce the power consumption and increase the power efficiency by terminating the operation of the charge pump 204 in a signal feedback manner.

The detection unit 208 further receives a system enabling signal ENS, such as a voltage signal, for enabling the voltage regulation device 200. When the system enabling signal ENS has the disabled level, the enabling signal EN' is continuously kept at the disabled level such that the timing signal generating unit 202 and the charge pump 204 are continuously kept disabled and the output voltage Vout' cannot be generated. When the system enabling signal ENS has the enabled level, the detection unit 208 starts to detect the control signal SC to judge the current value of the current signal I2 and thus to control the charge pump 204.

Figure 2B:
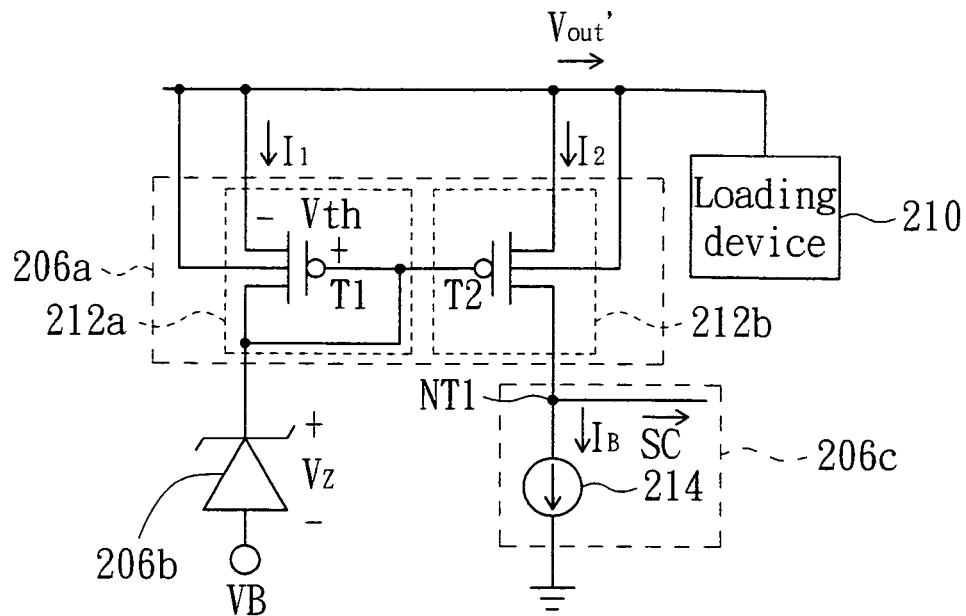
FIG. 2B is a detailed circuit diagram showing a voltage regulation unit 206 of FIG. 2A.

FIG. 2B is a detailed circuit diagram showing a voltage regulation unit 206 of FIG. 2A. As shown in the example of FIG. 2B, the current mapping unit 206a is a current mirror including two PMOS (P-type Metal Oxide Semiconductor) transistors T1 and T2 in this embodiment. The transistors T1 and T2 are respectively the master current end 212a and the slave current end 212b, and the current signals I1 and I2 are respectively the source currents of the transistors T1 and T2. The gates of the transistors T1 and T2 are coupled to each other, and the sources of the transistors T1 and T2 are also coupled to each other to receive the output voltage Vout'. The drains of the transistors T1 and T2 are respectively coupled to the negative end of the Zener diode 206b and the biasing unit 206c.

Such that the transistors T1 and T2 have substantially the same gate-emitter voltage. In this embodiment, the transistors T1 and T2 having the same aspect ratio (Width/Length) will be illustrated as an example. Thus, the transistors T1 and T2 have substantially the same source current. That is, the current signals I1 and I2 are substantially the same. Wherein, the transistor T1 is, for example, biased as a forward diode and the temperature coefficient of the transistor T1 is minus.

In this embodiment, the predetermined voltage level is substantially equal to Vout=|Vth|+|Vz1|. The Zener diode 206b clamps the voltage value of the output voltage Vout' to the predetermined voltage level, wherein Vth is the threshold voltage of the transistor T1, and Vz1 is the breakdown voltage of the Zener diode 206b. When the voltage level of the output voltage Vout' is equal to Vout<|Vth|+|Vz1|, that is, the voltage level of the output voltage Vout' is too low to reach the predetermined voltage level, the transistors T1 and T2 are cut off, and the current values of the current signals I1 and I2 are substantially equal to zero. When the voltage level of the output voltage Vout' is equal to Vout=|Vth|+|Vz1|, that is, the voltage level of the output voltage Vout' reaches the predetermined voltage level, the transistors T1 and T2 are ON and operate in the saturation region. At this time, the current values of the current signals I1 and I2 are greater than zero and substantially the same.

The biasing unit 206c includes a current source 214 and a node NT1. The current source 214 outputs a bias current IB, which is introduced into the grounding level through the node NT1. The voltage of the node NT1 is determined by the current signal I2 and the bias current IB. When the output voltage Vout' does not reach the predetermined voltage level, the transistor T2 is cut off, and the current value of the current signal I2 is substantially equal to zero. At this time, the voltage level of the node NT1 is biased approximate at the grounding level by the bias current IB. When the output voltage Vout' reaches the predetermined voltage level, the transistor T2 is ON and operates in the saturation region. At this time, the current value of the current signal I2 is greater than zero to increase the voltage level of the node NT1 from about the grounding level to about the voltage level of the output voltage Vout'. That is, the voltage level of the node NT1 is biased to the high-voltage level. In this embodiment, the voltage of the node NT1 further serves as the control signal SC to be outputted to the detection unit 208.

Figure 2C:
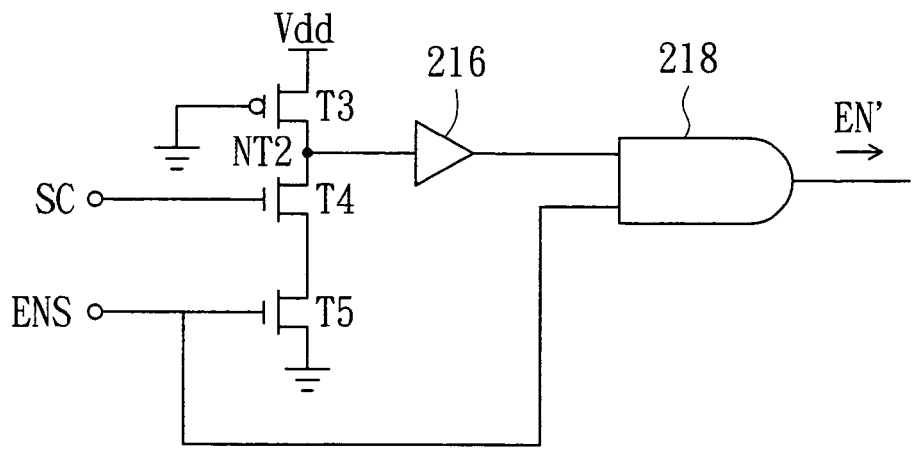
FIG. 2C is a detailed circuit diagram showing a detection unit 208 of FIG. 2A.

FIG. 2C is a detailed circuit diagram showing a detection unit 208 of FIG. 2A. As shown in the example of FIG. 2C, the detection unit 208 of this embodiment includes transistors T3, T4 and T5, a buffer 216 and an AND gate 218. The source of the transistor T3 receives a high-voltage level Vdd, the gate of the transistor T3 receives the grounding level such that the transistor T3 is always ON to form a path coupled to the high-voltage level Vdd to bias the voltage level of the node NT2 to the high-voltage level Vdd. The transistors T4 and T5 are NMOS transistors. The transistor T5 has a source for receiving the grounding level, a drain coupled to the source of the transistor T4 and a gate for receiving the system enabling signal ENS. The drain of the transistor T4 is coupled to the drain of the transistor T3 to form the node NT2. The gate of the transistor T4 receives the control signal SC. The transistors T4 and T5 are connected in series to form a grounding path to bias the voltage level of the node NT2 to the grounding level. The grounding path is controlled by the control signal SC and the system enabling signal ENS.

In this embodiment, the enabled levels of the system enabling signal ENS and the enabling signal EN' are the high-voltage levels, and the disabled levels of the system enabling signal ENS and the enabling signal are the low-voltage levels. When the system enabling signal ENS has the disabled level, the enabling signal EN' is always controlled to be the disabled level regardless of the level of the control signal SC. At this time, the voltage regulation device 200 is disabled. When the system enabling signal ENS has the enabled level and the control signal SC has the high-voltage level, the system enabling signal ENS and the control signal SC respectively enables the transistors T4 and T5 to pull down the voltage level of the node NT2 to the grounding level. Thus, the voltage level of the node NT2 is the low-voltage level, and the enabling signal EN' thus has the disabled level. Consequently, the detection unit 208 can make the enabling signal EN' have the disabled level according to the control signal SC kept on the high-voltage level so as to disable the operation of the charge pump 204 through the timing signal generating unit 202.

When the system enabling signal ENS has the enabled level and the control signal SC has the low-voltage level, the control signal SC disables the transistor T4, such that the voltage level of the node NT2 becomes the high-voltage level and the enabling signal EN' has the enabled level. Consequently, the detection unit 208 can make the enabling signal EN' become the enabled level according to the control signal SC at the low-voltage level so as to enable the operation of the charge pump 204 through the timing signal generating unit 202.

Figure 2D:
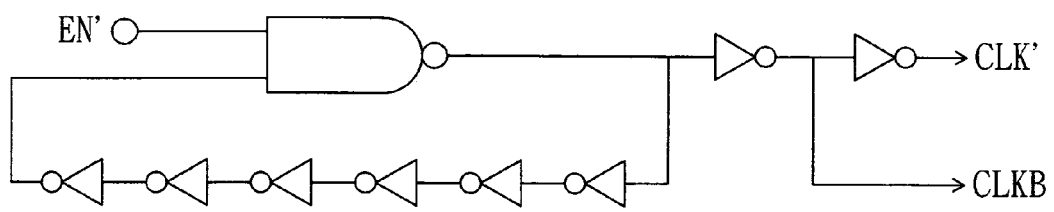
FIG. 2D is a detailed circuit diagram showing a timing signal generating unit 202 of FIG. 2A.
Figure 2E:
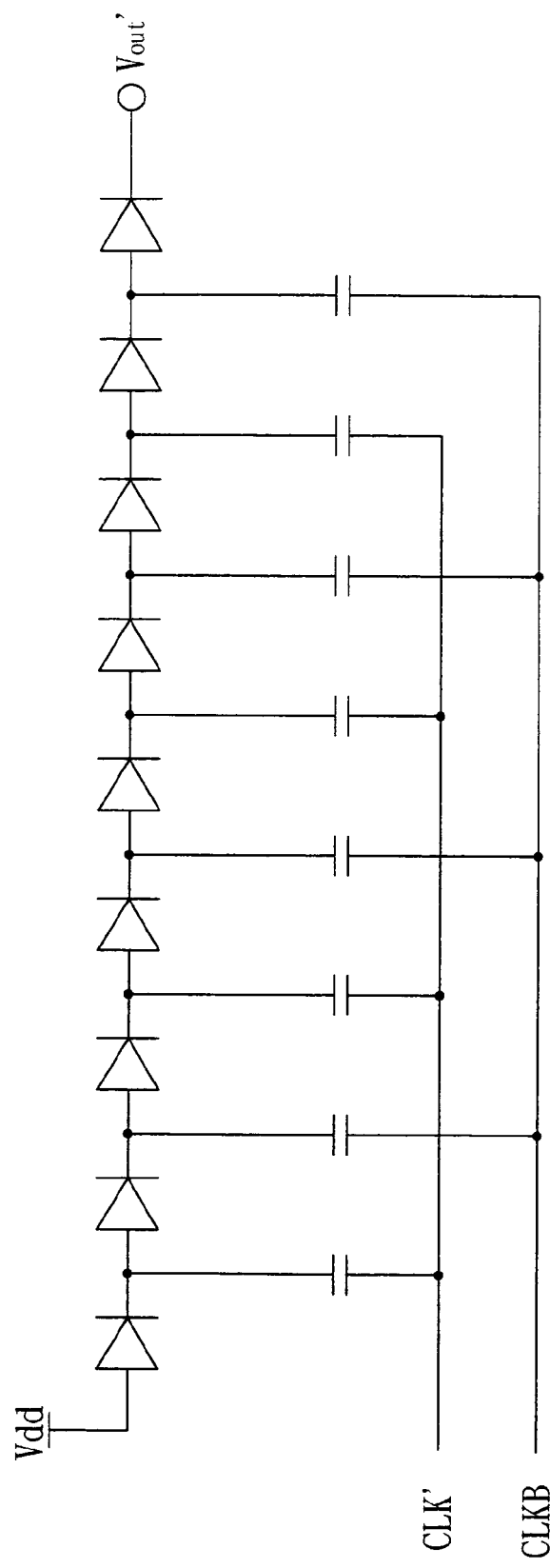
FIG. 2E is a detailed circuit diagram showing a charge pump 204 of FIG. 2A.

The timing signal generating unit 202 may be, for example, the well-known timing signal generating circuit, as shown in FIG. 2D. The timing signal generating unit 202 receives the enabling signal EN' to output the timing signal CLK' and the backward timing signal CLKB according to the property of inverting the voltage level of the inverter. The charge pump 204 may also be, for example, a well-known charge pump circuit, as shown in FIG. 2E. The charge pump 204 receives the timing signal CLK', the backward timing signal CLKB and the high-voltage level Vdd, and generates the output voltage Vout' under the control of the timing signal CLK' and the backward timing signal CLKB according to the high-voltage level Vdd. The high-voltage level Vdd may be, for example, the input voltage of the charge pump 204.

The loading device 210 may be, for example, a flash memory. The output voltage Vout' is inputted to the bit line for the flash memory to provide a voltage to inject the electrons to the floating gate of the transistor in the flash memory cell to perform the data writing procedure; or to provide a voltage to attract the electrons from the floating gate to perform the data clearing procedure.

Although the current values of the current signals I1 and I2 in this embodiment are substantially the same, the current signals I1 and I2 may have different current values. Although the current mapping unit 206a is a current mirror including two PMOS transistors T1 and T2 in this embodiment, the current mapping unit 206a is not restricted to the structure of this embodiment and may be another current mirror, for example, a cascode current mirror or may be a circuit structure capable of outputting two current signals with two associated current values. Although the enabling signal EN' is inputted to the timing signal generating unit 202 to control the charge pump 204 indirectly in this embodiment, the voltage regulation device 200 of this embodiment may also be a device having the charge pump 204 with the enabled signal pins, wherein the enabling signal EN' is directly inputted to the charge pump 204 to control the operation of the charge pump 204.

The voltage regulation unit and the voltage regulation device with the Zener diode according to this embodiment generate two current signals with two associated current values according to the output voltage. The voltage regulation unit and the voltage regulation device with the Zener diode according to this embodiment input one current signal to the Zener diode to regulate the output voltage and convert another current signal into the control signal to judge whether the output voltage reaches the predetermined voltage level according to the control signal. The voltage regulation unit and the voltage regulation device with the Zener diode according to this embodiment further feed the control signal back to the charge pump so as to disable the charge pump when the output voltage reaches the predetermined voltage level. Consequently, the voltage regulation unit with the Zener diode according to this embodiment can effectively improve the disadvantages of the high power consumption and the low power efficiency because the conventional voltage regulation device cannot shut down the charge pump when the output voltage reaches the predetermined voltage level. Thus, the voltage regulation unit and the voltage regulation device with the Zener diode according to this embodiment have the advantages of the low power consumption and the high power efficiency.

Besides, the voltage regulation unit and the voltage regulation device with the Zener diode according to this embodiment bias the output voltage to the predetermined voltage by using Zener Diode and master current end, which is substantially a forward biased diode. And the temperature coefficient of the forward biased diode is minus. Such that, the positive temperature coefficient of the Zener Diode is compensated by the minus temperature coefficient of the forward biased diode, and the voltage level of the output voltage is less effected by the temperature of the voltage regulation unit and voltage regulation device with the Zener diode. Thus, the voltage regulation unit and the voltage regulation device with the Zener diode according to this embodiment have the advantages of having output voltage less effected by the temperature thereof, in comparison with the conventional voltage regulation device.

Additionally, the voltage regulation unit and the voltage regulation device with the Zener diode according to this embodiment regulate the output voltage and control the act of the charge pump with simple and negative feedback circuit structure with Zener diode, current mapping unit, and logic gates. Thus, the voltage regulation unit and the voltage regulation device with the Zener diode according to this embodiment have the advantages of having simple circuit structure and low cost, in comparison with the conventional voltage regulation device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A voltage regulation unit for receiving a driving voltage outputted from a charge pump and regulating the driving voltage, the voltage regulation unit comprising:

a current mapping unit, which comprises a master current end and a slave current end, for receiving the driving voltage and generating a first current signal and a second current signal at the master current end and the slave current end according to the driving voltage, respectively;

a Zener diode having a negative end coupled to the master current end and a positive end for receiving a constant voltage, the Zener diode receiving the first current signal and controlling a voltage level of the driving voltage to be substantially equal to a predetermined voltage level to regulate the driving voltage; and a biasing unit for receiving the second current signal, judging whether the voltage level of the driving voltage reaches the predetermined voltage level according to the second current signal, and generating a control signal according to the second current signal, wherein the control signal is fed back to the charge pump to control the charge pump to generate the driving voltage.

2. The voltage regulation unit according to claim 1, wherein the control signal is inputted into a detection unit, which receives a first enabling signal to generate a second enabling signal according to the first enabling signal and the control signal.

3. The voltage regulation unit according to claim 2, wherein the second enabling signal is inputted into a timing signal generating unit, which generates a timing signal and a backward timing signal according to the second enabling signal.

4. The voltage regulation unit according to claim 3, wherein the charge pump receives the timing signal and the backward timing signal, generates the driving voltage according to the timing signal and the backward timing signal, and outputs the driving voltage.

5. The voltage regulation unit according to claim 1, wherein the charge pump further receives an input voltage and generates the driving voltage according to the input voltage.

6. A voltage regulation device, comprising:

a charge pump for outputting a driving voltage;

a voltage regulation unit, which comprises:

a current mapping unit comprising a master current end and a slave current end, the current mapping unit receiving the driving voltage and generating a first current signal and a second current signal at the master current end and the slave current end according to the driving voltage, respectively;

a Zener diode having a negative end coupled to the master current end and a positive end for receiving a constant voltage, the Zener diode receiving the first current signal and controlling a voltage level of the driving voltage to be substantially equal to a predetermined voltage level to regulate the driving voltage; and a biasing unit for receiving the second current signal, judging whether the voltage level of the driving voltage reaches the predetermined voltage level according to the second current signal, and generating a control signal according to the second current signal;

a detection unit for receiving the control signal and generating a first enabling signal according to the control signal; and a timing signal generating unit for receiving the first enabling signal and generating a timing signal and a backward timing signal according to the first enabling signal, wherein the timing signal and the backward timing signal are outputted to the charge pump, which generates the driving voltage according to the timing signal and the backward timing signal.

7. The voltage regulation device according to claim 6, wherein the detection unit further receives a second enabling signal and generates the first enabling signal according to the second enabling signal and the control signal.

8. The voltage regulation device according to claim 7, wherein the second enabling signal is a system enabling signal for enabling the voltage regulation device to perform a voltage regulating operation.

9. The voltage regulation device according to claim 6, wherein the charge pump further receives an input voltage and generates the driving voltage according to the input voltage, the timing signal and the backward timing signal.

* * * * *